United States Patent Office 2,962,108
Patented Nov. 29, 1960

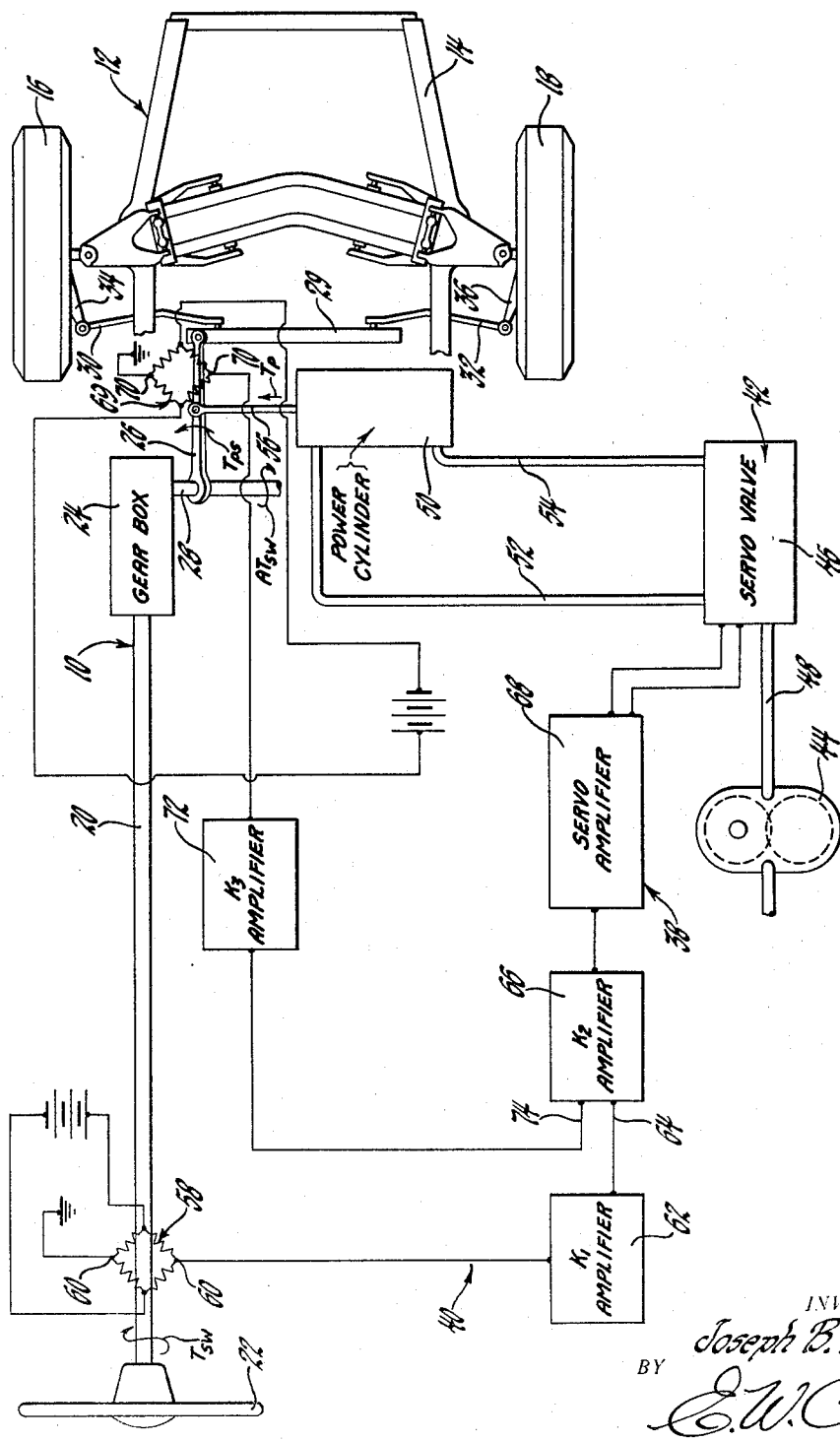

2,962,108

SERVO SYSTEM WITH CONTROLS FOR VEHICULAR POWER STEERING

Joseph B. Bidwell, Birmingham, Mich., assignor to General Motors Corporation, Detroit, Mich., a corporation of Delaware Filed June 2, 1958, Ser. No. 739,226

2 Claims. (Cl. 180—79.2)

The present invention relates to power or force servo systems and, more particularly, to such a system for use in an automotive steering mechanism for eliminating the effects of internal friction in the steering mechanism.

At the present time it is common for automotive vehicles to be equipped with so-called power steering wherein power means are operatively interconnected with the steering mechanism to supply a force or power that supplements the torque exerted by the operator. Normally, a torque responsive pickup is employed to sense the amount of torque supplied by the operator and to actuate the power means in response thereto. Heretofore, these supplementary power systems have failed to in any way sense the internal friction in the steering mechanism resulting from movements of such parts as the steering shaft, gear box, etc. As a consequence, it is necessary for the operator to manually overcome this friction. Since this friction is dependent upon the amount of torque and the direction thereof, it may be erratic and tend to produce an objectionable feel to the steering mechanism.

It is now proposed to provide a manually actuated steering mechanism having a force or power servo system interconnected therewith so that the effects of the friction within the steering mechanism are substantially eliminated. More particularly, this is to be accomplished by providing supplementary power means which are interconnected with the steering mechanism to supply supplementary power thereto. A first pickup is provided that is responsive to the amount of input torque supplied by the operator and a second or feedback pickup is provided that is responsive to the total of the forces in the steering system posterior to the point at which the supplementary force is applied to the steering mechanism. The signals from these two pickups are differentially combined with each other to form a resultant signal that actuates the power boost means. The responsiveness of the two pickups to their respective forces and the responsiveness of the power boost means to the resultant signal are proportioned to apply a force to the steering mechanism that will not only supplement the force exerted by the operator so as to assist him in moving the dirigible road wheels, but will also compensate for any internal friction in the steering mechanism. Thus the reaction force felt by the operator at the steering wheel will be confined substantially to only a predetermined percentage of the force required to position the dirigible wheels and the effects of internal friction will be substantially eliminated.

In the one sheet of drawings:

The figure is a diagrammatic showing of a steering system embodying the present invention.

Referring to the drawings in more detail, the present invention is adapted to be embodied in a steering mechanism 10 for an automotive vehicle 12 having a frame 14 with a pair of dirigible road wheels 16 and 18 independently sprung from the front end thereof. The steering mechanism 10 includes a steering shaft 20 having a steering wheel 22 on one end thereof suitably disposed for an operator to manually turn or apply a torque thereto. The opposite end of the steering shaft 20 is interconnected with a gear box 24. This gear box 24 includes a set of gears such as a worm and sector. These gears are effective to actuate a pitman arm 26 mounted on the end of a shaft 28 extending from the side of the gear box 24. The outer end of the pitman arm 26 is operatively interconnected with a transverse drag link 29 suspended between a pair of tie rods 30 and 32. The outer ends of the tie rods 30 and 32 are pivotally connected to steering knuckles 34 and 36. It may therefore be seen that whenever the operator applies a torque to the steering wheel 22 so as to cause movement, there will be a corresponding movement of the front wheels 16 and 18. The amount of the movement of the front wheels 16 and 18 will be dependent upon the amount of movement of the steering wheel 22 and the mechanical advantage of the steering mechanism 10 or the steering ratio A.

In order to supplement the torque supplied by the operator, a force or power servo system 38 may be provided. In the present instance this servo system 38 includes a control section 40 and a hydraulic section 42. The hydraulic section 42 comprises a pump 44, a servo valve 46 that is interconnected with the pump 44 by a high pressure supply line 48 and a hydraulic power cylinder 50 which has the opposite ends thereof interconnected with the servo valve 46 by a pair of lines 52 and 54. The power cylinder 50 includes a piston that is operatively interconnected with the pitman arm 26 by means of a piston rod 56. It may thus be seen that actuation of the servo valve 46 by the control section 40 will cause the servo valve 46 to direct the high pressure fluid from the pump 44 to the appropriate end of the cylinder 50 and in the desired quantities to cause the piston rod 56 to exert a force on the pitman arm 26 in the required direction and with the desired magnitude. This supplementary force will be effective to assist the operator in turning the front wheels 16 and 18.

The control section 40 includes a first pickup 58 which is located on the steering shaft 20 immediately adjacent the steering wheel 22 so as to sense the amount of torque supplied by the operator. Although any suitable pickup may be employed, in the present instance it comprises a variable resistance electrical strain gauge arranged to form a bridge circuit. Any strain in the steering shaft 20 will result in a corresponding deformation of the resistance elements in the bridge. This will unbalance the bridge and produce a potential difference between the diagonal corners 60 of the bridge. The polarity and magnitude of the resultant signal will be determined by the direction and amount of torque applied to the steering wheel 22 by the operator. The diagonal corners 60 are interconnected to an amplifier 62 for increasing the signal by some predetermined factor. The gain of the amplifier 62 may be represented by $K_1$. The output of this amplifier 62 is in turn interconnected with one of the inputs 64 to a second amplifier 66 that is effective to further increase the strength of the signal by a gain of $K_2$. The cascading of these amplifiers 62 and 66 will have a combined gain represented by the product of $K_1 \cdot K_2$. The output from this amplifier 66 is in turn interconnected with the input to a servo amplifier 68. The output of this amplifier 68 is in turn interconnected with the servo valve 46 for regulating the supply of hydraulic fluid to the power cylinder 50.

It may thus be seen that whenever the operator supplies a torque to the steering wheel shaft 20, the amount of torque will be sensed by the strain gauge 58 which will produce a signal indicative thereof. This signal will then be fed into the first amplifier 62 and then into the second amplifier 66 so as to be amplified by $K_1 \cdot K_2$. As a result a signal will be supplied to the servo amplifier 68 that will be a function of the manually applied torque and the amplification factor $K_1 \cdot K_2$. This will cause the servo valve 46 to actuate the power cylinder 50 and supply a supplementary force to the pitman arm 26 so as to assist the operator in turning the front wheels 16, 18.

The effective torque $T_p$ supplied by the power cylinder 50 to the pitman arm 26 will be determined by the gains $K_1$ and $K_2$ of the amplifiers 62 and 66 and the manually applied torque $T_{sw}$ at the steering wheel 22. More particularly, if only the foregoing portions of the control section 40 are considered, this may be mathematically defined as $$(1) \qquad T_p = K_1 K_2 T_{sw}$$

If any friction $F$ exists in the steering mechanism 10, the sum of forces $T_{ps}$ at the pitman arm 26 will be $$(2) \qquad T_{ps} = A T_{sw} + T_p \pm F$$

By substituting Equation 1 in Equation 2

$$(3) \qquad T_{ps} = A T_{sw} + K_1 K_2 T_{sw} \pm F$$

Solving for $T_{sw}$ $$(4) \qquad T_{sw} = \frac{T_{ps} \pm F}{A + K_1 K_2}$$

Thus it may be seen that with only this portion of the system being employed, although the internal friction forces $F$ in the steering mechanism 10 are reduced by the amount of mechanical advantage and amplification gains $K_1$ and $K_2$, they are still present.

The control system 40 may also include a second or feedback pickup 69 that is responsive to the total amount of force in the steering mechanism 10 posterior to the point at which the power piston is connected to the pitman arm 26. This pickup 69 is intended to sense the entire force required to control the front wheels 16 and 18. Accordingly, it is equal to the sum of the forces in the steering knuckles 34 and 36 or tie rods 30 and 32. Although the pickup 69 may sense these forces directly, provision must be made for isolating the force for controlling the wheels 16 and 18 from shocks or impact loads that are produced by the road wheels 16 and 18 traveling over an irregular surface. By placing the feedback pickup 69 on the pitman arm 26, the steering forces will be mechanically summed. In the present instance the feedback pickup 69 is similar to the first pickup in that it comprises a bridge type strain gauge. The diagonally opposite corners 70 of this bridge are interconnected with an input to a third amplifier 72 having a gain of $K_3$. The output of this amplifier 72 is in turn interconnected with a second input 74 to the second amplifier 66. The second amplifier 66 is effective to differentially combine the signals from the amplifiers 62 and 72 and produce a resultant signal that will be determined by the difference between the two signals and the gain $K_2$ of the second amplifier 66.

It may now be seen that, if the entire system is considered, Equation 1 must be rewritten as follows:

$$(5) \qquad T_p = K_2 (K_1 T_{sw} - K_3 T_{ps})$$

and Equation 2 becomes $$(6) \qquad T_{ps} = A T_{sw} + T_p \pm F$$

If Equation 5 is substituted into Equation 6, the result is $$(7) \qquad T_{ps} = A T_{sw} + K_2 (K_1 T_{sw} - K_3 T_{ps}) \pm F$$

This may be simplified to $$(8) \qquad T_{ps} = T_{sw}(A + K_1 K_2) - T_{ps} K_2 K_3 \pm F$$

Solving this Equation 8 for the torque $T_{sw}$ at the steering wheel, it will be seen that $$(9) \qquad T_{sw} = \left(\frac{1 + K_2 K_3}{A + K_1 K_2}\right) T_{ps} \pm \left(\frac{F}{A + K_1 K_2}\right)$$

By choosing the amplification $K_1$, $K_2$ and $K_3$ factors of amplifiers 62, 66 and 72 so that the products of $K_2 K_3$ is much greater than 1 and so that the product of $K_1 K_2$ is much greater than the steering ratio $A$, Equation 9 may be rewritten as an approximation $$(10) \qquad T_{sw} \simeq \frac{K_3}{K_1} T_{ps} \pm \frac{F}{K_1 K_2}$$

It may thus be seen that $K_2$ has little direct effect on the overall amount of supplementary power that is added to the steering mechanism. However, it has a very large effect in reducing the effects of the internal friction produced in the mechanism 10. Thus the ratio of $$\frac{K_3}{K_1}$$

is the predominating factor for determining the amount of assistance the system will give to the operator.

What is claimed is:
1. Apparatus for applying force to a movable member comprising, in combination, a manually operable member, a mechanical linkage connected between said manually operable member and said movable member, said mechanical linkage having internal friction and having a predetermined mechanical advantage, first force sensing means connected to said manually operable member and adapted to produce a first electrical signal related by a first function to the force that is manually applied to said manually operable member, second force sensing means connected to said movable member and adapted to produce a second electrical signal related by a second function to the force that is applied to said movable member, electrical means connected to receive said first and second signals and adapted to produce an electrical output that is related by a third function to the difference between said first and second electrical signals, power assist means connected to receive said electrical output and having an output coupled to said movable member, said power assist means being adapted to apply a force to said movable member related in magnitude to said electrical output, the product of said first and third functions being much greater than the mechanical advantage of said mechanical linkage, the product of said second and third functions being much greater than unity, whereby the ratio of the force applied to said manually operable member to the total force applied to said movable member will be related to the ratio of said first and second functions and will be substantially unrelated to friction in said mechanical linkage.

2. Apparatus for applying steering force to wheels of a vehicle comprising, in combination, a manually operable steering wheel, a steering member connected to said vehicle wheels, a mechanical linkage connected between said steering wheel and said steering member, said mechanical linkage having internal friction and having a predetermined mechanical advantage, torque sensing means connected to said steering wheel and adapted to produce a first electrical signal related by a first function to the torque that is manually applied to said steering wheel, force sensing means connected to said steering member and adapted to produce a second electrical signal related by a second function to the force that is applied to said steering member, electrical means connected to receive said first and second electrical signals and adapted to produce an electrical output that is related by a third function to the difference between said first and second electrical signals, power assist means connected to receive said electrical output and having an output coupled to said steering member, said power assist means being adapted to apply a force to said steering member related in magnitude and direction to said electrical output, the product of said first and third functions being much greater than the mechanical advantage of said mechanical linkage, the product of said second and third functions being much greater than unity, whereby the ratio of the torque manually applied to said steering wheel to the force resulting on said steering member will be related to the ratio of said first and second functions and will be substantially unrelated to friction in said mechanical linkage and to the magnitude of said third function.

References Cited in the file of this patent

UNITED STATES PATENTS

| | | |
|---|---|---|
| 2,754,465 | Brier | July 10, 1956 |
| 2,804,264 | Stern | Aug. 27, 1957 |
| 2,808,659 | Dehnul | Oct. 8, 1957 |
| 2,851,795 | Sherman | Sept. 16, 1958 |